(12) United States Patent
Mikuriya et al.

(10) Patent No.: US 7,190,514 B2
(45) Date of Patent: Mar. 13, 2007

(54) CONFOCAL SCANNING MICROSCOPE

(75) Inventors: Kenta Mikuriya, Musashino (JP);
Yasuhiro Tanibata, Musashino (JP);
Hideomi Negishi, Musashino (JP);
Naoki Seki, Musashino (JP); Yasuhito Kosugi, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 10/916,425

(22) Filed: Aug. 12, 2004

(65) Prior Publication Data

US 2006/0033988 A1  Feb. 16, 2006

(51) Int. Cl.
*G02B 21/06* (2006.01)
*G02B 21/00* (2006.01)

(52) U.S. Cl. .................. 359/385; 359/368; 359/388

(58) Field of Classification Search ........ 359/368–390; 250/234; 356/73.1; 372/6, 23; 385/122–128; 351/200–247
See application file for complete search history.

(56) References Cited

U.S. PATENT DOCUMENTS

| | | | | |
|---|---|---|---|---|
| 5,081,350 A | * | 1/1992 | Iwasaki et al. | 250/234 |
| 5,459,505 A | * | 10/1995 | Ballegaard et al. | 347/260 |
| 5,566,196 A | * | 10/1996 | Scifres | 372/6 |
| 5,952,668 A | * | 9/1999 | Baer | 250/492.2 |
| 6,111,635 A | * | 8/2000 | Iida et al. | 356/73.1 |
| 6,456,369 B1 | * | 9/2002 | Ohki et al. | 356/73.1 |
| 6,486,458 B1 | * | 11/2002 | Schoeppe et al. | 250/205 |
| 6,603,780 B2 | * | 8/2003 | Miyai | 372/23 |
| 6,717,723 B2 | * | 4/2004 | Arai | 359/368 |
| 6,909,542 B2 | * | 6/2005 | Sasaki | 359/385 |

FOREIGN PATENT DOCUMENTS

JP  5-60980  3/1993

* cited by examiner

*Primary Examiner*—Thong Q Nguyen
(74) *Attorney, Agent, or Firm*—Westerman, Hattori, Daniels & Adrian, LLP.

(57) ABSTRACT

The present invention provides a confocal scanning microscope whereby fluorescence observations can be made using a plurality of types of excitation light without the need for attaching and detaching a light source to and from the optical fiber. The confocal scanning microscope comprises:
 a light source unit for emitting excitation light that excites a sample;
 a scanner unit for scanning the sample with the excitation light; and
 an imaging camera for capturing an image of the sample by receiving fluorescent light emitted from the sample;
the light source unit having a plurality of light sources for emitting laser light with different wavelengths and a multicore optical fiber cable for transmitting light from the plurality of light sources, one end of the multicore optical fiber cable being separated into a plurality of optical fibers, and light from each of the plurality of light sources being input to one end of each of the separate optical fibers.

5 Claims, 6 Drawing Sheets

FIG.4A  Prior Art
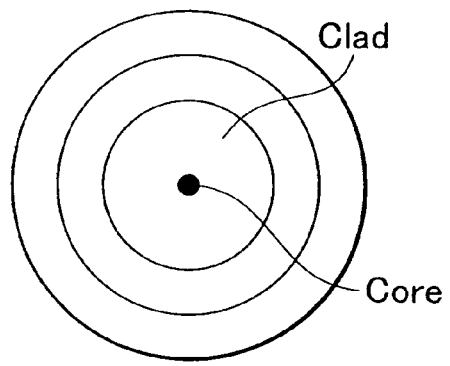
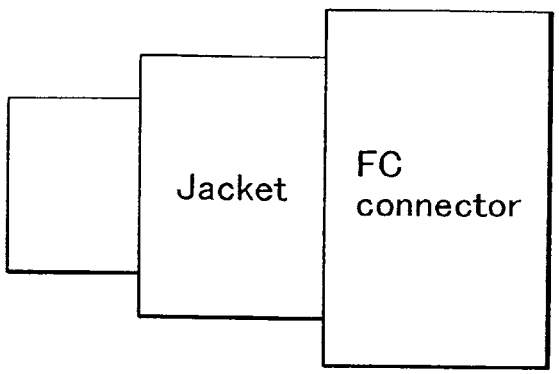
Conventional optical fiber (Single mode)
Front view — Side view
FIG.4B
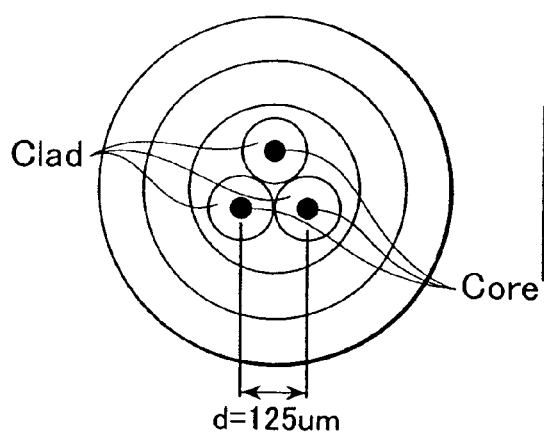
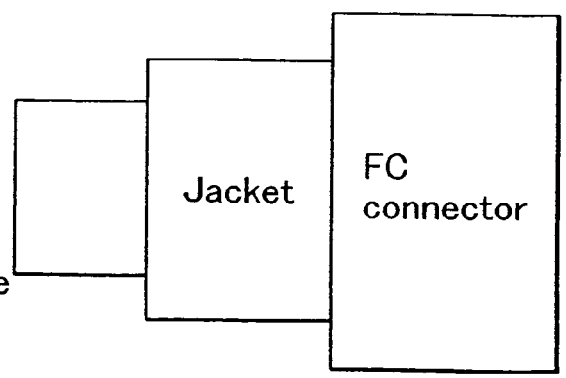
Bundled optical fiber (Comprising three single mode fibers)
Front view — Side view

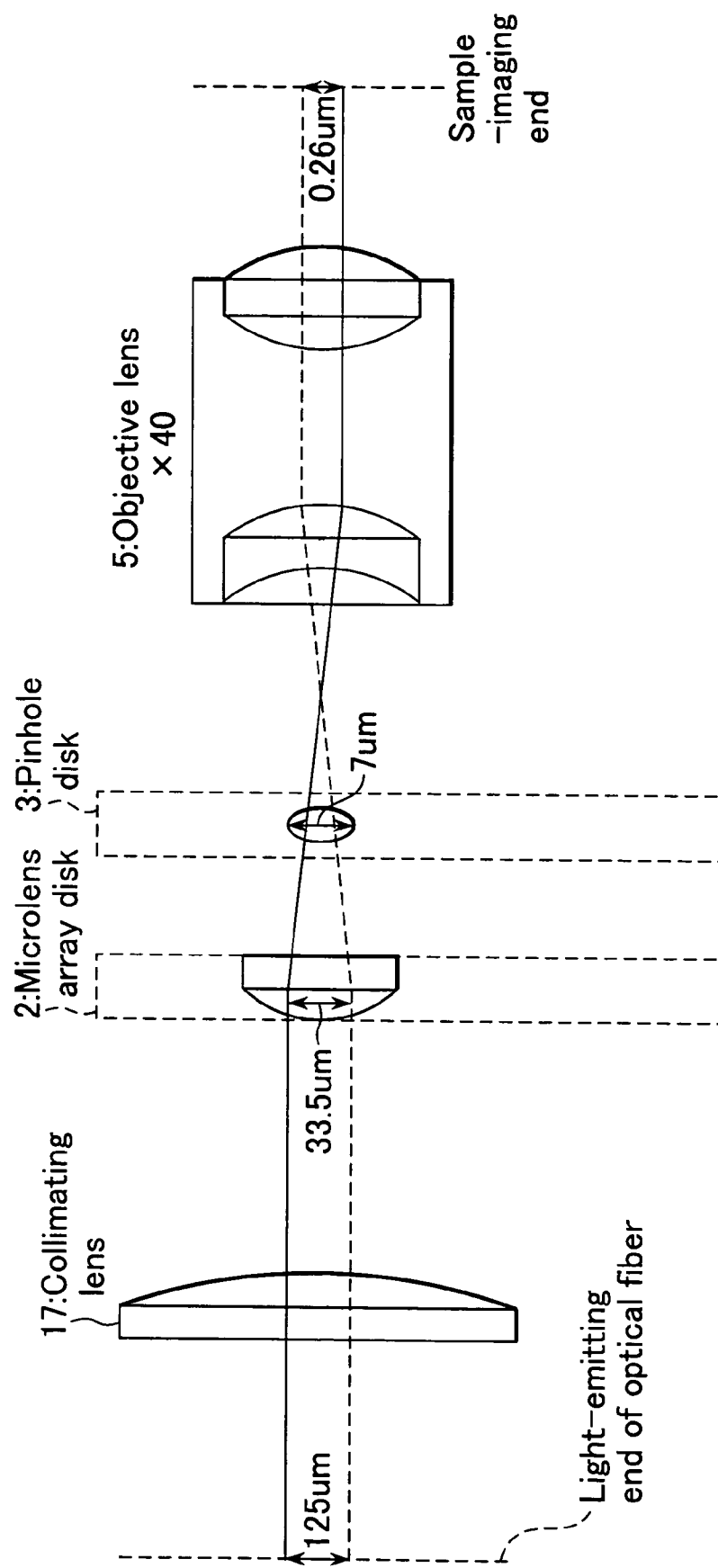
FIG.5 Graphical representation of the amount of displacement

FIG.6A
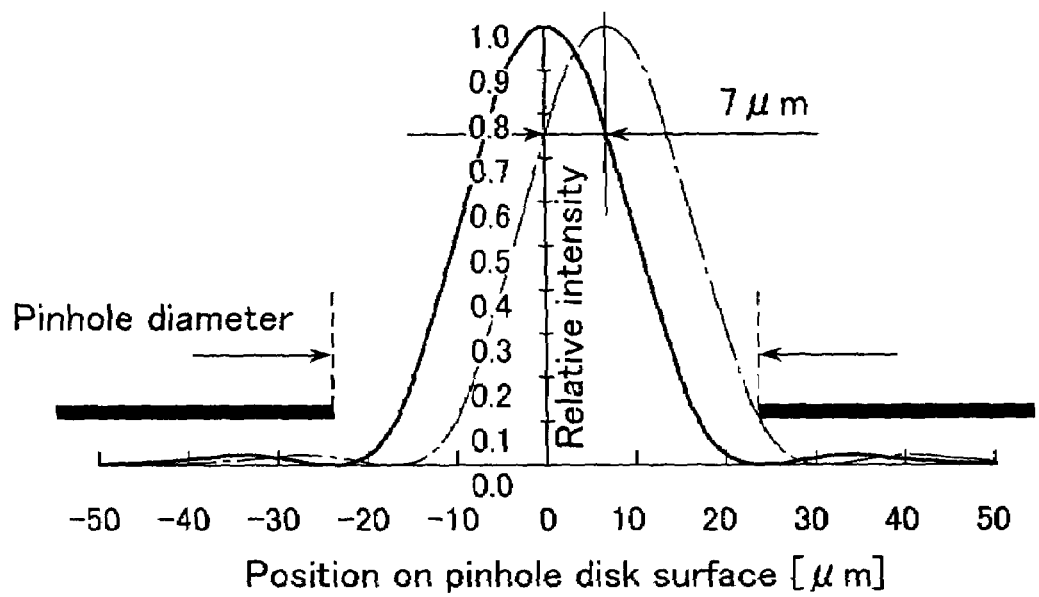
Cross-sectional intensity distribution of focal spot on pinhole disk
FIG.6B
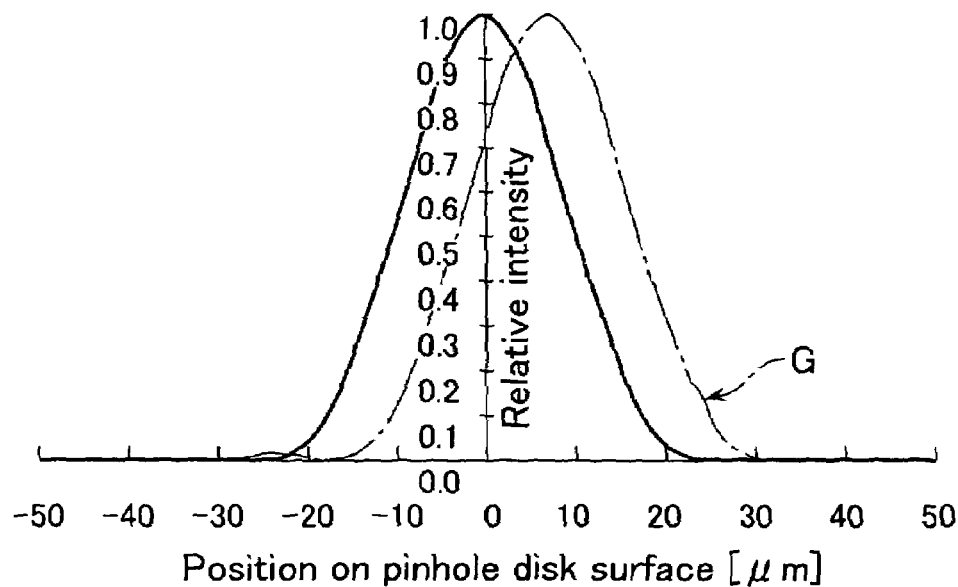
Cross-sectional intensity distribution of light immediately after light has passed through the pinhole

CONFOCAL SCANNING MICROSCOPE

BACKGROUND OF THE INVENTION

1. Field of the Invention

The present invention relates to a confocal scanning microscope and, more particularly, to improvements made to a light source unit for inputting light from a light source to an optical fiber.

2. Description of the Prior Art

Confocal scanning microscopes have heretofore been well-known. An example of a confocal optical scanner for use with a confocal scanning microscope, there is the one illustrated in FIG. 1 and described in the official gazette of Japanese Laid-open Patent Application 1993-60980, for example.

In FIG. 1, laser light emitted from laser light source 1 is first introduced to an excitation filter (not shown in the figure) to remove extra wavelength components of the light source so that only the wavelength component to be used for excitation is allowed to go out.

After being broadened to an appropriate beam diameter, this outgoing light (laser light) enters the microlens array of microlens array disk 2 in the scanner unit. Laser light thus entering the microlens array is condensed by each individual microlens onto each pinhole in pinhole disk 3 positioned in opposition to such each individual microlens.

As a result of condensation, the amount of light that can pass through pinhole disk 3 increases greatly. In addition, amounts of light (noise light), reflected on the parts of the disk surface other than the pinholes, decrease, thus improving the S/N ratio of images.

Dichroic mirror 4 is placed between microlens array disk 2 and pinhole disk 3, and excitation light passes through this dichroic mirror 4.

Laser light that has exited a pinhole in pinhole disk 3 passes through objective lens 5 and excites sample 6. Fluorescent light coming out of sample 6 passes through objective lens 5 and pinholes of pinhole disk 3, reflects upon dichroic mirror 4, and is introduced to an optical observation path system. The catoptric and stray components of excitation light mixed with fluorescent light going out of the scanner unit and entering the optical observation path system are removed by barrier filter 25. Then the fluorescent light enters high-sensitivity imaging camera 8 and fluorescent images of sample 6 are observed in the camera.

It should be noted that microlens array disk 2 and pinhole disk 3 are assembled into an integral structure so that the overall area under observation can be scanned by rotating the assembly.

In a conventional apparatus for confocal scanning microscopy such as that described above, the confocal optical scanner unit thereof is advantageous in that it is possible to improve the characteristics of image forming and reduce the amount of surface reflection from the pinhole disk surface. However, the scanner has only one excitation light source for irradiating samples, and the light source to be connected to the optical fiber must be changed in order to excite samples using light (laser) with a different wavelength.

FIG. 2 is a schematic view illustrating how laser light is input to a single mode optical fiber cable 15d by switching between light sources with wavelengths of, for example, 488 nm and 532 nm.

For the above-noted reason, the conventional apparatus has been problematic in that it is not possible to observe different types of fluorescence produced by other types of excitation lights simultaneously. Another problem is that extra time is required to attach and detach a light source to and from the optical fiber. Yet another problem is that vibration arising when the light source is attached to or detached from the optical fiber causes the sample to move.

SUMMARY OF THE INVENTION

The present invention is intended to solve the aforementioned problems. One object of the present invention therefore, is to provide a confocal scanning microscope whereby fluorescence observations can be made using a plurality of types of excitation light with the single inlet of the optical fiber used with the conventional confocal scanning microscope left as is, without the need for attaching and detaching a light source to and from the optical fiber.

Another object of the invention is to provide a confocal scanning microscope whereby the type of fluorescent substance in a sample can be easily identified by placing filters in a light-detecting unit and changing the characteristics of the filters.

BRIEF DESCRIPTION OF THE DRAWINGS

FIG. 4A is a conventional single mode optical fiber.

FIG. 4B is an enlarged cross-sectional view showing the core-to-core distance when three optical fibers are bundled.

FIG. 5 is a schematic view illustrating how the core-to-core distance decreases depending on the combination of lenses.

FIG. 6 is a graphical view illustrating the cross-sectional intensity distributions of a focal spot on the pinhole disk and of light immediately after the light has passed through the pinhole.

DETAILED DESCRIPTION OF THE PREFERRED EMBODIMENTS

Figure 1:
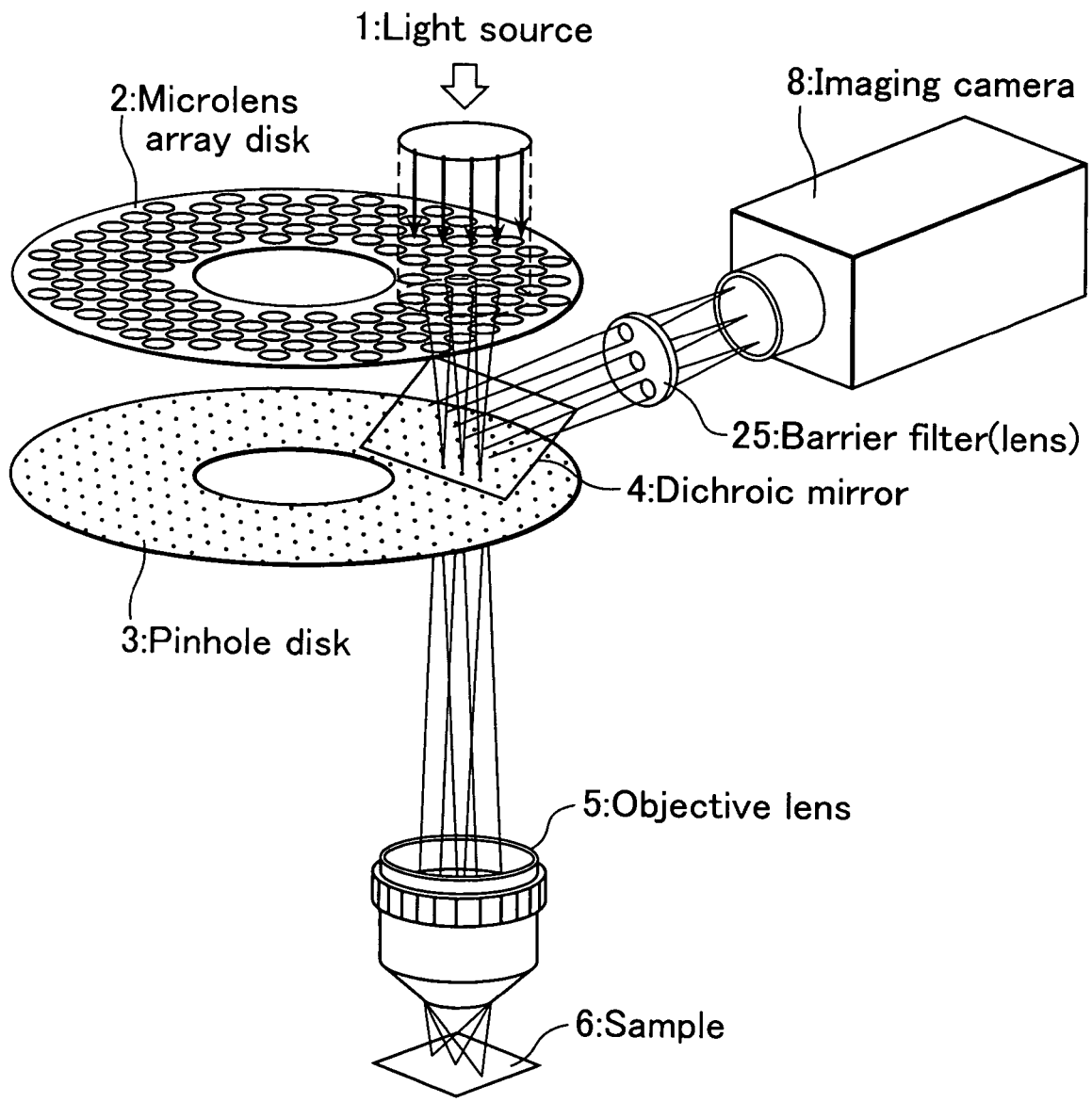
FIG. 1 is a schematic view illustrating the substantial part of a conventional confocal optical scanner.
Figure 2:
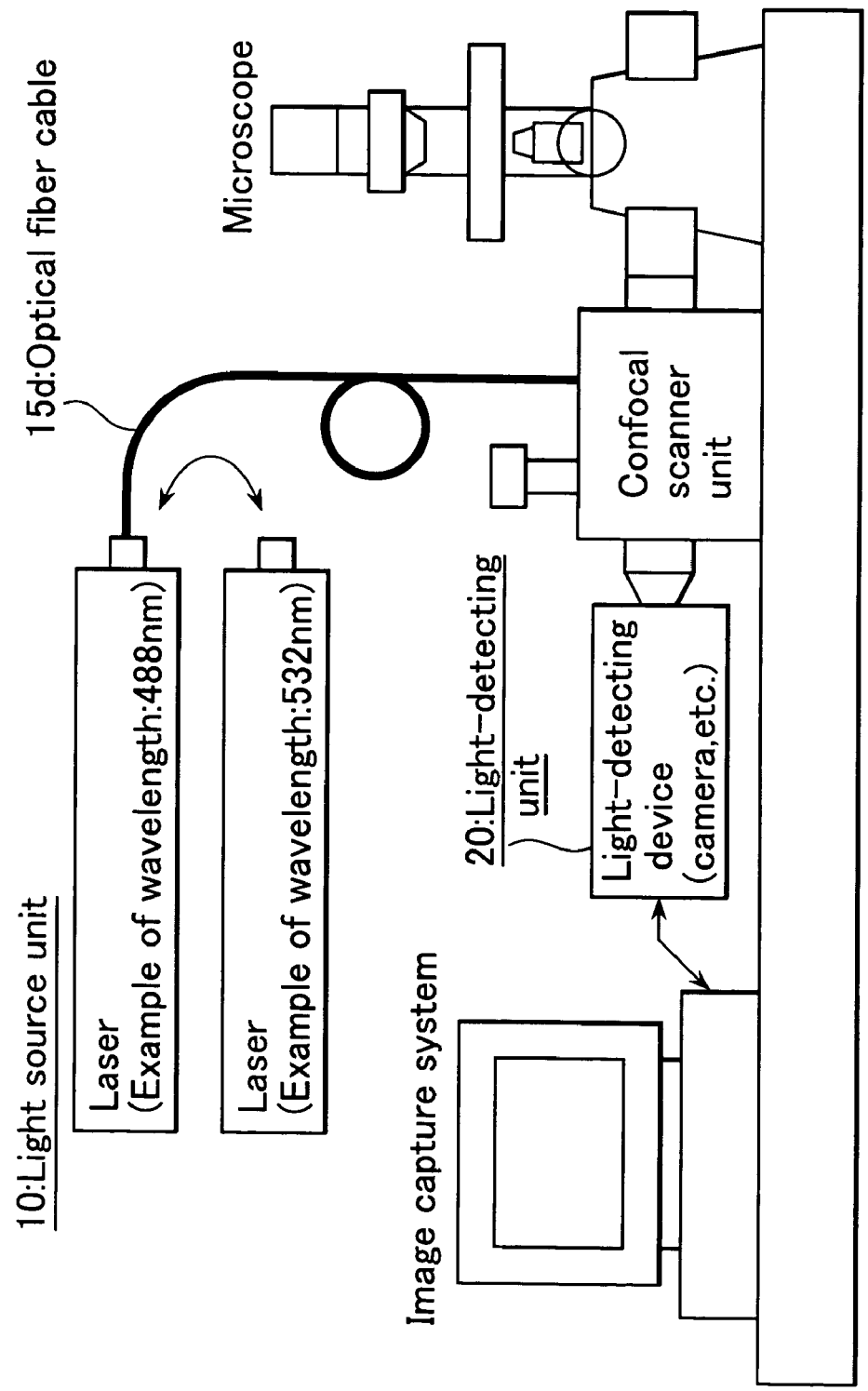
FIG. 2 is a schematic view illustrating an example of how one laser is changed to another in a confocal scanning microscope.
Figure 3:
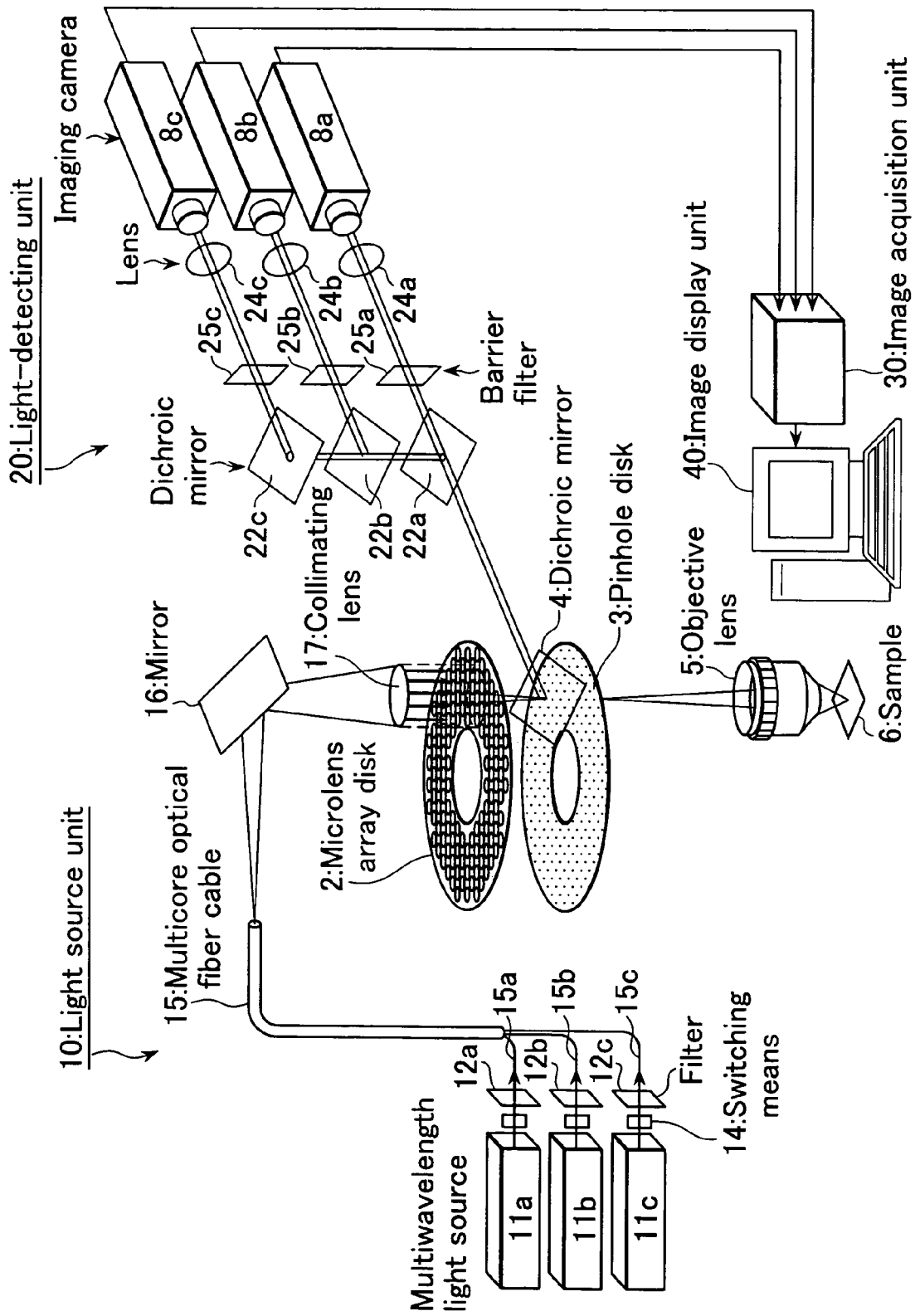
FIG. 3 is a schematic view illustrating one embodiment of a confocal scanning microscope in accordance with the present invention.

The present invention will hereinafter be described in detail with reference to the accompanying drawings. FIG. 3 is a conceptual schematic view illustrating one embodiment of a confocal scanning microscope in accordance with the present invention. In FIG. 3, elements identical to those of FIG. 1 are indicated with the same reference numerals. FIG. 3 differs from FIG. 1 in that light source unit 10 and light-detecting unit 20 are incorporated in place of light source 1 and imaging camera 8.

Light source unit 10 comprises a plurality of multiwavelength light sources 11a, 11b and 11c, switching means 14 for admitting and blocking light from the light sources and filters 12a, 12b and 12c with different optical passbands.

Light that has passed through switching means 14 transmits through filters 12a, 12b and 12c and enters a plurality of optical fibers 15a, 15b and 15c branching off from multicore optical fiber cable 15 in proportion to the number of light sources. Light that has exited the other end of multicore optical fiber cable 15 enters mirror 16. Mirror 16 reflects this light to let it enter collimating lens 17. Collimating lens 17 changes incoming light into parallel light, which then enters microlens array disk 2.

Light-detecting unit 20 comprises dichroic mirrors 22a, 22b and 22c, barrier filters 25a, 25b and 25c, lenses 24a, 24b and 24c, and imaging cameras 8a, 8b and 8c. Barrier filter 25 comprises a plurality of filters with different wavelength passband characteristics. Output light that has transmitted through barrier filter 25 is condensed by lens 24 to enter imaging camera 8. Imaging camera 8 intensifies a captured image, converts the image into an electric signal, and outputs the signal.

Image acquisition unit 30 converts the electric signal output by imaging camera 8 into image data and stores the data.

Image display unit 40, for which a computer is used in most cases, reads images stored in image acquisition unit 30 and properly processes the images to display them.

The behavior of the confocal scanning microscope configured in the manner described above is explained hereinafter.

In light source unit 10, each of the light beams emitted from three multiwavelength light sources 11a, 11b and 11c is input through switching means 14 and filters 12a, 12b and 12c to one end of each of a plurality of separate optical fibers 15a, 15b and 15c.

Light output from multicore optical fiber cable 15 reflects upon mirror 16 and enters collimating lens 17. Light that has been collimated by collimating lens 17 enters microlens array disk 2.

It should be noted that mirror 16 is unnecessary if it is possible to directly input the output light of optical fiber 15 to collimating lens 17.

Fluorescent light emitted from sample 6 usually contains a plurality of wavelengths. For example, first dichroic mirror 22a transmits light with the wavelength $\lambda 1$ and reflects light with other wavelengths. Next, second dichroic mirror 22b receives light reflected from first dichroic mirror 22a, reflects light with the wavelength $\lambda 2$, and transmits light with other wavelengths. Third dichroic mirror 22c receives light that has passed through second dichroic mirror 22b and reflects light with the wavelength $\lambda 3$.

Thus, separate fluorescent light is provided by three dichroic mirrors 22a, 22b and 22c so that rays of fluorescent light with three different wavelengths are individually output. Light output from dichroic mirror 22 is input to barrier filters 25a, 25b and 25c. By narrowing the wavelength passband with this barrier filter 25, it is possible to reject wavelengths other than desired ones and allow only the light with the desired wavelength to enter imaging camera 8, thereby improving the S/N ratio of images.

Respective rays of output light that have passed through the barrier filters are condensed by lenses 24a, 24b and 24c and enter imaging cameras 8a, 8b and 8c. The three imaging cameras convert captured images into electric signals and output the signals. Image acquisition unit 30 converts these electric signals into digital image data and stores the image data after correlating the data with the colors of separate fluorescent light provided by the dichroic mirrors.

Image display unit 40 reads the image data and filter information stored in image acquisition unit 30, reproduces the original colors of fluorescent light (color reproduction), and displays fluorescence images. Needless to say, it is also possible to display fluorescence images without carrying out color reproduction.

As described above, it is possible to simultaneously measure respective fluorescence images with separate wavelengths provided by the dichroic mirrors.

Now, the amount of displacement of light output from a multicore optical fiber cable will be explained. FIG. 4A illustrates a conventional single mode optical fiber, whereas FIG. 4B illustrates the three optical fibers used in this embodiment. In FIG. 4A, there is no displacement of light since the optical fiber has only one core.

In FIG. 4B however, there is a displacement of 125 µm caused when the three fiber cables are bundled. The smaller this displacement is, the more advantageous it is for the confocal scanning microscope to display crisp images. It is technically and economically difficult however to thin the clads further to bring the cores closer to one another.

FIG. 5 is a graphical representation showing the results of the calculation of changes in the amount of displacement with regard to the optical axis of light emitted from the multicore optical fiber cable at a conventional scanner unit comprising collimating lens 17, microlens array disk 2, pinhole disk 3 and objective lens 5, where the multicore optical fiber cable has a core-to-core distance of 125 µm.

Light collimated by collimating lens 17 enters microlens array disk 2. At this point of entry, the distance is reduced to 33.5 µm. The distance decreases to 7 µm the moment the light condensed at the microlens array disk passes through pinhole disk 3. The distance further decreases to 0.26 µm the moment the light irradiates the sample after passing through objective lens 5 (×40 magnification) These distance values are calculated from data on the lenses currently in use.

FIG. 6A shows the cross-sectional intensity distribution of a focal spot on pinhole disk 3. FIG. 6B shows the cross-sectional intensity distribution of light immediately after the light has passed through the pinhole disk 3, indicating how light having a displacement of 7 µm for the pinhole diameter currently in use is transmitted (attenuated) (point G shown in FIG. 6B indicates how the waveform is cut due to optical axis displacement). According to calculations made by the inventors, transmittance when there is no displacement is 86.9% and transmittance when there is a displacement of 7 µm is 86.3%. It is now understood that transmittance is basically not affected even if there is an optical axis displacement of 7 µm.

It should be noted that specific preferred embodiments have been shown and described heretofore only for the purpose of explaining and illustrating the present invention. It will therefore be apparent to those skilled in the art that various changes, modifications or alterations to the invention as described herein, may be made without departing from the spirit and essential characteristics thereof. For example, the present invention has been described in this embodiment taking as an example the case where the core-to-core distance between optical fibers is 125 µm. Alternatively, the distance should preferably be shorter if this is technically and economically feasible.

Also in the embodiment, an example has been taken wherein three optical fibers and three imaging cameras are included and three units each of dichroic mirrors, barrier filters and lenses are provided accordingly. Alternatively, one unit each of an imaging camera, dichroic mirror, barrier filter and lens may be provided and fluorescent light is received in a time division manner.

It is also possible to include two or more or four or more light sources and provide as many optical fibers. It is also possible to improve the S/N ratio of images if a light source with only one of the wavelengths is selected and put into use by the switching means.

The scope of the present invention is given by the appended claims and all modifications and variations which fall within the range of the claims are intended to be embraced therein.

As described above, the following advantageous effects are achieved according to the present invention.

It is possible to provide a confocal scanning microscope whereby fluorescence observations can be made using a plurality of types of excitation light with the single inlet of the optical fiber used with the conventional confocal scanning microscope left as is, without the need for attaching or detaching a light source to or from the optical fiber.

It is also possible to provide switching means between light sources and separated optical fibers to selectively switch from one light source to another, thereby improving the S/N ratio of images.

It is also possible to easily colorize captured images by obtaining a plurality of types of separate screens provided by dichroic mirrors.

What is claimed is:

1. A confocal scanning microscope comprising:
   a light source unit for emitting excitation light that excites a sample;
   a scanner unit for scanning said sample with said excitation light; and
   an imaging camera for capturing an image of said sample by receiving fluorescent light emitted from said sample;
   said light source unit having a plurality of light sources for emitting laser light with different wavelengths and a multicore optical fiber cable for transmitting light from said plurality of light sources, one end of said multicore optical fiber cable being separated into a plurality of optical fibers, and light from each of said plurality of light sources being input to one end of each of said separated optical fibers;
   wherein said scanner unit comprises;
   a collimating lens for changing excitation light to parallel light;
   a microlens array disk at which light from said collimating lens is irradiated;
   a pinhole disk for light condensed by said microlens array disk to pass through; and
   an objective lens to which light from said pinhole disk is input;
   wherein at the output end of said multicore optical fiber cable, a plurality of cores are arranged in proximity to one another to the extent whereby, images, which are produced when light obtained as light emitted from said plurality of light sources passes through said scanner unit and reflects at said sample is photographed with said imaging camera, do not adversely affect image observation; and
   wherein said plurality of cores are arranged with respect to one another such that after said light obtained as light emitted from said plurality of light sources passes through the pinhole disk, the optical axis displacement between the plurality of emitted lights is approximately 7 μm or less.

2. The confocal scanning microscope of claim 1 having separation means for separating fluorescent light emitted from said sample into fluorescent light with different wavelengths and a plurality of sets of detection systems comprising imaging cameras, wherein separate light from said separation means is individually introduced to said detection system so that a plurality of separate light can be simultaneously observed.

3. The confocal scanning microscope of claim 1, wherein switching means is provided between each of said light sources and each of separate optical fibers.

4. The confocal scanning microscope of claim 1, wherein said plurality of cores are arranged with respect to one another such that after said light obtained as light emitted from said plurality of light sources passes through the pinhole disk, the transmittance of the plurality of lights is approximately 86% or greater.

5. The confocal scanning microscope of claim 1, wherein at the output end of said multicore optical fiber cable, a plurality of cores are arranged in proximity to one another such that the core-to-core distance is 125 μm or less.

* * * * *